July 24, 1956
H. F. GERWIG ET AL
2,755,777
LOCKING, DAMPING AND RATE CONTROL MEANS
FOR FLUID PRESSURE SERVO SYSTEMS
Filed Dec. 16, 1952
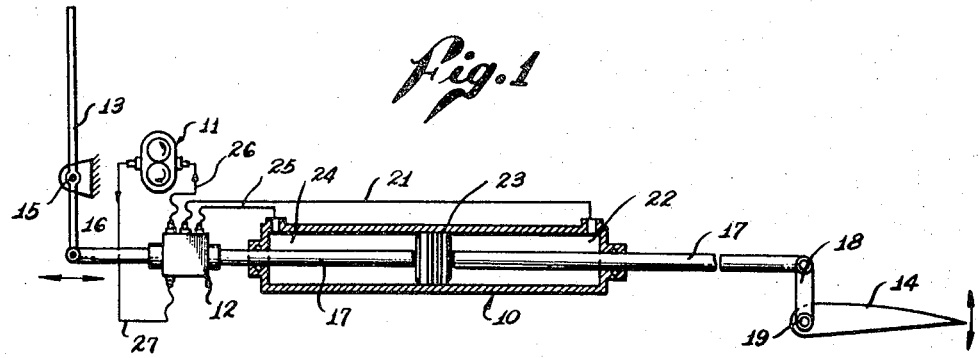
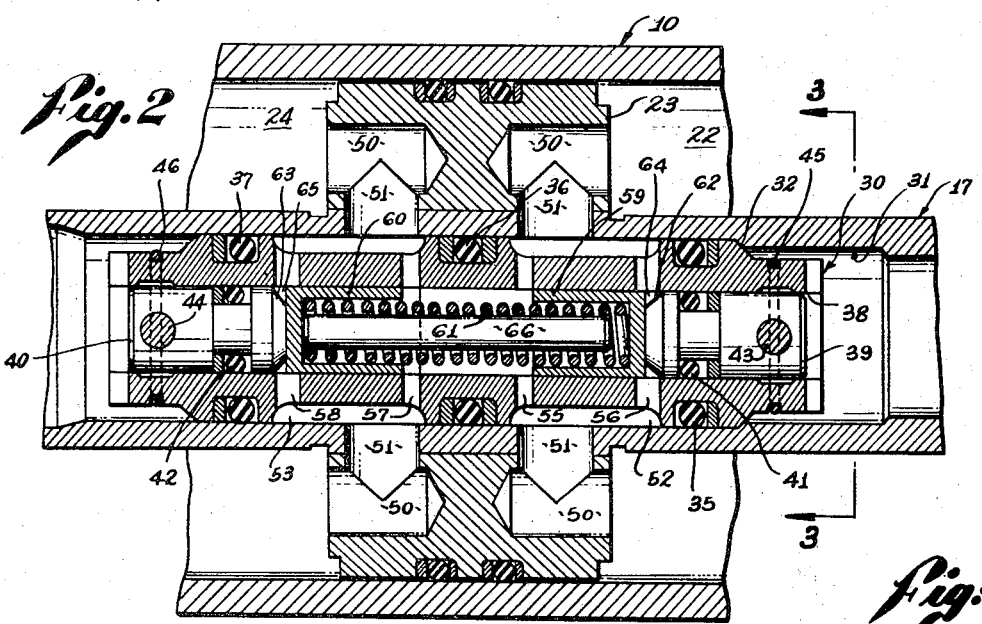
INVENTORS
HARVEY F. GERWIG
HERMAN M. EHRHARDT
CYRIL W. FRANKLIN
FREDERICK O. HOSTERMAN
By Fulwider, Mattingly & Babcock
Attorneys

United States Patent Office 2,755,777
Patented July 24, 1956

2,755,777

LOCKING, DAMPING AND RATE CONTROL MEANS FOR FLUID PRESSURE SERVO SYSTEMS

Harvey F. Gerwig, Glendale, Herman M. Ehrhardt, Altadena, Cyril W. Franklin, Glendale, and Frederick O. Hosterman, Burbank, Calif., assignors to Weston Hydraulics, Limited, North Hollywood, Calif., a corporation of California Application December 16, 1952, Serial No. 326,244

13 Claims. (Cl. 121—41)

The present invention relates generally to fluid pressure servo systems, and more particularly, to a means for locking the motor element of such systems, and to a system in which such locking means is modified by damping and rate control means to permit the locked member to yield gradually to external forces.

Because the invention is particularly useful in hydraulic systems for moving the control surfaces and other elements in aircraft, such an arrangement has been illustrated and described herein as embodying the invention. It will be realized, however, that the usefulness of the invention is not limited to the controls of aircraft but has a broader application to all fluid pressure servo systems in which it is desired to provide, selectively, a degree of irreversibility or locking of the object to be moved.

It is conventional practice in modern aircraft to augment the manual power actuating the control surfaces, landing gear, bomb bay doors, and similar elements with fluid pressure power means usually employing hydraulic fluid. In many instances, the motivating power is almost entirely hydraulic, and is merely controlled by manual operation of the movable control members.

Systems of the class described include a source of fluid under pressure, a manually operated control valve, and a fluid motor, connected to the object to be moved, e. g., a control surface in an airplane. The manual controls of the valve may be and usually are, also linked to the object to be moved so as to provide a follow-up system by which the manual control member always assumes a position corresponding to that of the object moved. Such mechanical linkage also provides means by which the controlled object may be moved entirely by manual effort in the event of a failure of the fluid pressure system. An example of the last-named arrangement is disclosed in copending application Serial No. 201,358, filed December 18, 1950, entitled Irreversible Hydraulic Pressure Power Actuator, now Patent No. 2,633,102, issued March 31, 1953.

An additional advantage of the arrangement disclosed in said copending application is that even upon a failure of the pressure system therein disclosed, the fluid remaining in the fluid motor serves as a locking medium to prevent the object being moved from moving under the influence of external forces in a direction contrary to that urged by the manual controls. Such a locking arrangement is desirable, for example, on the controls of grounded aircraft to prevent gusts of wind from battering the movable air foils, such as elevators and the rudder, against the stops limiting their movement. Arrangements of this type have been provided in the past, and have usually been termed "gust locks." Previous gust locks have been provided in the form of supplementary units operated by the pilot after the aircraft has been landed and parked. Such previous arrangements have had several disadvantages as follows:

1. If the pilot, through inadvertence, neglects or fails to activate the conventional gust lock system after parking the aircraft, it is of course ineffective with the result that severe damage to the control surfaces may result.

2. If the gust lock is inadvertently operated while the aircraft is in the air, the controls may be set in such a position as to cause the aircraft to go out of control with the obvious disastrous results.

3. Conventional gust locks usually are positive in nature, permitting no movement whatsoever of the control surfaces when locked. This is a disadvantageous arrangement since if the control surfaces are not permitted to yield slowly to external wind forces, gusts may result in overturning the aircraft or causing it to move about on the ground.

With the foregoing in mind, it is a major object of the present invention to provide a locking system of the type described which includes damping and rate control means by which the object being moved, for example, an aircraft control surface, is locked against sudden movement contrary to that urged by the manual control member, but in which said object may yield gradually to external forces and move gradually in response thereto.

It is another object of the invention to provide a locking system of the type described which is directly incorporated into a fluid servo power system, thus obviating the necessity of activating the locking system at any given time.

Still another object of the invention is to provide a locking, damping, rate control system of the class described which may be incorporated in a double-acting servo system to operate with equal efficacy on motion of the controlled member in either direction.

A still further object of the invention is to provide a damping and rate control unit which can be incorporated in existing fluid pressure servo systems without substantial modification of the latter.

An additional object of the invention is to provide a locking unit of the class described which may be incorporated in aircraft control systems in a manner to aid the pilot in flying the aircraft under manual control in the event of a failure of the fluid pressure source in the servo system.

The foregoing and other objects and advantages of the invention will become apparent from the following detailed description thereof, consideration being given likewise to the attached drawings, wherein:

Figure 1 is a semi-schematic diagram of a hydraulic servo system connected to an aircraft control surface;

Figure 2 is an enlarged elevational section taken on the axis of the piston in the servo motor illustrated in Figure 1;

Figure 3 is an elevational section taken on the line 3—3 in Figure 2;

Figure 4 is a fragmentary oblique section taken on the line 4—4 in Figure 3; and Figure 5 is a fragmentary oblique section taken on the line 5—5 in Figure 3.

Referring first to Figure 1 for a description of a system embodying the present invention, a double-acting fluid motor has been indicated by the reference character 10, a fluid pump supplying pressurized actuating fluid for the motor 10 is indicated at 11, a four-way control valve interposed between the pump 11 and the motor 10 is shown at 12, a manual control lever for operating the valve 12 is shown at 13, and a movable air foil operated by the control member 13 and the motor 10 is indicated at 14. The control lever 13 is mounted on a fixed pivot 15 and is mechanically linked by means of a rod 16, the valve 12, a piston rod 17, and a crank arm 18, to the air foil 14, the latter being pivoted on a fixed pivot at 19. Thus, it will be seen that, quite apart from the power that may be applied by the motor 10, the air foil 14 may be moved up and down, as indicated by the double arrow adjacent thereto, by rearward and forward movement of the control lever 13.

As is described in detail in the above-mentioned copending application, the valve 12 is so designed that tension in the linkage 16—17 places the valve in a position to deliver fluid under pressure through a conduit 21 to the cylindrical chamber 22 at one side of the piston 23 in the motor 10. At the same time, fluid is exhausted from the opposite chamber 24 through a conduit 25. Such exhausted fluid from the conduit 25 is returned to the pump 11 through a return conduit 26, while pressurized fluid is supplied to the valve 12 through a pressure conduit 27.

Conversely, compression in the linkage 16—17 places the valve 12 in an opposite condition wherein pressure fluid is delivered through the conduit 25 to the motor chamber 24 and exhausted from the chamber 22 through the conduit 21.

When no substantial stress is present in the linkage 16—17, a centering spring (not shown) places the valve 12 in a central neutral position wherein the conduits 21 and 25 are blocked off from each other. Inasmuch as the details of construction of the valve 12 do not form an essential part of the present invention, no further description of the valve is deemed necessary herein.

From the foregoing description, it will be seen that in the absence of any force exerted on the control lever 13, the centering of the valve 12, and the consequent blocking of the conduits 21 and 25, the entire system can move only if some supplementary passage is provided by which fluid may be transferred from the chamber 22 to 24, or vice versa. It is with this supplementary fluid transfer means that the present invention deals.

Referring now to Figure 2 in the drawings, it will be seen that the piston rod 17 is tubular whereby to receive a damping and rate control cartridge 30 in the central bore 31 thereof. To position and support the cartridge 30, the bore 31 is formed with an internal shoulder 32 against which the cartridge 30 is seated and locked in place by a radial pin 33 (see Figure 5), the latter being retained in place by a set screw 34 threaded into the piston 23 behind the pin 33, after the same has been inserted. The cartridge 30 is provided with a plurality of O-ring seals 35, 36 and 37, whereby to block off the bore 31 against the passage of fluid therethrough except through the cartridge 30, as will be described hereinafter.

The cartridge 30 is provided with a central bore 38, the opposite ends of which are closed by plugs 39 and 40, sealed in the bore 38 by O-rings 41 and 42, and retained therein by cross pins 43 and 44. Pins 43 and 44 are in turn retained by external snap rings 45 and 46 fitted in appropriate grooves in the cartridge 30.

Communication of the power chambers 22 or 24 with the bore 31 is provided in the form of intersecting passageways 50 and 51, formed in the piston 23 and the piston rod 17 at the point at which piston 23 is secured thereto, as by brazing or other suitable means.

The cartridge 30 is formed with a pair of annular external recesses 52 and 53 with are positioned to underlie the piston passageways 50—51, whereby the annular recess 52 receives the fluid from the power chamber 22, and in similar fashion the power chamber 24 is communicated with the annular recess 53. The annular recess 52 is communicated by a plurality of radial passageways 55 and 56 with the bore 38 of the cartridge 30. Similarly, the annular recess 53 is communicated with the bore 38 through radial passages 57 and 58.

Slidably received within the bore 38 and in substantially fluid-tight sealing engagement therewith, are a pair of piston valves 59 and 60, respectively underlying the annular fluid recesses 52 and 53. The piston valves 59 and 60 are so positioned with respect to the respective radial passageways 55 and 57 as to normally leave the latter open but to close the same upon sliding movement toward the mid-point of the cartridge 30. The piston valves 59 and 60 are held in this normal open position by a compression spring 61, having its ends abutting against the interior of the valves 59 and 60, the latter being limited in their outward movement urged by the spring 61 in that they rest against the inner ends of the plugs 39 and 40.

The limiting inner ends of the plugs 39 and 40, it will be noted, respectively underlie the radial passageways 56 and 58 in the cartridge 30. It will also be noted that the inner ends of the plugs 39 and 40 are formed with conical noses 62 and 63 whereby to provide annular fluid chambers 64 and 65 immediately outside the piston valves 59 and 60. As will be described hereinafter, fluid under pressure admitted to one of the annular chambers 64 or 65 results in the inward sliding movement of the corresponding valve 59 or 60 to close the respective radial passageways 55 or 57. Such inward sliding movement of one or the other of the valves 59 and 60 is limited by a stop rod 66, loosely carried within the compression spring 61.

It will be noted that, since a single spring 61 is employed, the operation of the two valves 59 and 60 will be identical, i. e., they will each move exactly the same amount in response to a given pressure. For similar reasons, the valves are limited to exactly the same total amount of movement.

Thus, the device is symmetrical in operation, the hereinafter described damping effect being the same irrespective of the direction of movement of the piston 23.

Having described the construction of the cartridge 30 and the parts mounted therein, the operation thereof will now be described.

Assuming the valve 12 to be in a centered or neutral position, thus blocking any communication of fluid through the conduits 21 and 25, assume further an external force exerting a downward pressure on the air foil 14. Such pressure, it will be seen, will tend to move the piston rod 17 and the piston 23 to the right, thus increasing the pressure on the fluid trapped in the power chamber 22. As can be seen in Figure 2, such increase in the fluid pressure in the chamber 22 will urge such fluid to pass through the piston passageways 50—51 into the annular recess 52, thence through the radial passageways 55 into the bore 38 of the cartridge 30, and thence outwardly through the radial passageways 57, the annular recess 53, the piston passageway 51—50 into the power chamber 24. Such displacement of fluid from the chamber 22 to the chamber 24 permits the piston 23 to move to the right under the external force pressing downwardly on the air foil 14.

Due to the fact that the radial passageways 55 are substantially smaller than the remaining portions of the fluid passage between the chamber 22 and 24, said radial passageways present a substantial resistance to the passage of fluid therethrough, and thus build up fluid pressure in the annular recess 52. Such fluid pressure is increased as the rate of fluid displacement increases. When such fluid displacement rate reaches a predetermined value, the pressure in the annular recess 52, communicated through the radial passageways 56 to the annular chamber 64, is sufficient to move the piston valve 59 to the left, compressing the spring 61. Such leftward movement of the piston valve 59 closes the radial passageways 55, thus terminating the further displacement of fluid from the chamber 22 to the chamber 24. Were it not for other provisions hereinafter described, the system would remain locked in this condition until the external force were removed from the air foil 14, thus eliminating the excess pressure in the chamber 22 and permitting the spring 61 to reopen the valve 59.

It will be noted that the initially open passageways 55 and 57 introduce some delay in the power operation of the air foil 14 after the operating lever 13 is moved. This is due to the fact that a small amount of fluid escapes from one chamber into the other before the valve assembly 30 comes into operation to prevent such fluid transfer. However, the passageways 55 and 57, being relatively restricted with respect to the passageways 56 and 58, and the skirts of the valve members 59 and 60 being immediately adjacent the edges of the respective passageways 55 and 57, the above-mentioned delay in the application of power at the beginning of any power cycle is relatively insignificant. Furthermore, the manual force exerted on the rod 17 is immediately effective in starting to move the air foil 14, so that the slight delay in applying power after the control lever is moved is of no substantial consequence.

As previously mentioned, it is desirable that the air foil 14 be permitted to move gradually under the steady application of external pressure, and to this end, a small bleed orifice intercommunicating the chambers 22 and 24 is provided in the piston 23 (see Figure 4). The bleed orifice 70 is formed in a small set screw 71 which is threaded into an off-axis longitudinal passageway 72 formed in the piston 23. The effective area of the bleed orifice 70 is substantially smaller than the aggregate area of the radial passageways 55, and thus no substantial amount of fluid is displaced from one of the chambers 22—24 to the other, except such amount as is necessary to permit opening of the valve 59.

Thus it will be seen that when the aircraft has been landed and parked, the movable controls thereof will at all times be in a safe condition, not liable to be damaged by gusts of wind inasmuch as the rate at which the controls can move under the influence of such gusts is maintained at a point at which no damage will result upon the control member reaching the end of its travel. Furthermore, inasmuch as the controls can yield gradually to relatively steady wind pressures, such forces will have a minimum effect in overturning or otherwise moving the parked aircraft.

The system herein described has an additional advantage during the flying of the aircraft or the operation of other power augmentation servo systems. For example, assume the aircraft to be flying, and assume that some damage has occurred to the valve 12 or the pump 11 such that no fluid under pressure is available for operation of the motor 10, and yet the fluid communication through the conduits 21 and 25 is blocked. Assume further that the pilot wishes to move the air foil 14 upwardly against an intermittent or varying external force of substantial magnitude, perhaps greater at its peak value than could be overcome by the application of manual pressure alone. Such intermittent external forces are frequently encountered in the operation of aircraft, particularly the operation of the rotor members in helicopters.

Under the foregoing assumed conditions, the pilot could, by the steady exertion of force in the desired direction, move the air foil gradually in the desired direction, such rate of movement being less than that at which the damping action of the valve members 59 and 60 come into play, but adequate for the desired navigational effect on the aircraft. The intermittent external forces tending to counter said desired movement would be resisted by the locking operation of the valves 59 and 60, however, which would prevent the sudden retrogression of the air foil 14 under the urging of such external forces.

It will be recognized by those skilled in the art that the usefulness of the present invention is not limited to aircraft controls, but is also highly useful in such mechanisms as the power steering mechanisms of automobiles, trucks, and the like. In the last-named application, the damping and rate control features incorporated in the cartridge 30 would be effective in preventing the transmission to the steering controls, of road shocks such as occasioned by the dirigible wheels of the vehicle striking obstructions in the road. Such damping and rate control means would not, however, prevent the transmission of relatively steady forces from the dirigible wheels to the steering control, which provide the "feel" necessary in power steering mechanisms.

While the unit shown and described herein is fully capable of achieving the objects and providing the advantages hereinbefore stated, it will be realized that it is capable of considerable modification without departure from the spirit of the invention. For this reason, we do not mean to be limited to the form shown and described, but rather to the scope of the appended claims. Likewise, it will be realized that, while the form shown and described is the presently preferred mode of carrying out the invention, modifications may be necessary or desirable to meet various conditions of operation.

We claim:

1. A motion damping assembly for a movable element comprising in combination: a pair of expansible, contractible fluid chambers of mutually dependent complemental volumes having movable wall means mounted upon and connected to said element by piston rod means to coordinate the change in respective volumes of said chambers with movement of said element; fluid passageway defining means in said movable wall means and said piston rod in communication and adapted to intercommunicate said chambers; and valve means in said piston rod comprising a pair of movable valve members respectively in communication with each of the pair of chambers and respectively movable to block said passageway upon the pressure in the associated chamber increasing to a predetermined value.

2. A motion damping assembly for a movable element comprising in combination: a pair of expansible, contractible fluid chambers of mutually dependent complemental volumes having movable wall means mounted upon and connected to said element by piston rod means to coordinate the change in respective volumes of said chambers with movement of said element; fluid passageway defining means in said movable wall means and said piston rod in communication and adapted to intercommunicate said chambers; a pair of movable valve members in said piston rod means each adapted to move to close said passageway and each responsive to pressure in one of said chambers whereby to close said passageway upon the pressure in either of said chambers reaching a predetermined value; and spring means connected to each of said valve members and urging the same to a normally open position.

3. A motion damping assembly for a movable element comprising in combination: a pair of expansible, contractible fluid chambers of mutually dependent complemental volumes having movable wall means mounted upon and connected to said element by piston rod means to coordinate the change in respective volumes of said chambers with movement of said element; fluid passageway defining means in said movable wall means and said piston rod in communication and adapted to intercommunicate said chambers; a pair of movable valve members in said piston rod means, each normally positioned to leave said passageway open and adapted to move to close the same, and each valve member being responsive to pressure in one of said chambers whereby to close said passageway upon the pressure in either of said chambers reaching a predetermined value; and single spring means anchored between said valve members said spring means being constrained solely by said valve members and stressed to urge said valve members to open position.

4. In a double-acting fluid motor of the type having a cylinder and a movable piston carried by a hollow piston rod in said cylinder dividing the same into a pair of chambers of mutually dependent volume, locking and damping means comprising in combination: means forming a fluid passageway through said piston and piston rod to intercommunicate said chambers; and valve means in said piston rod spring biased to hold said passageway normally open and responsive to pressure in either of said chambers to actuate said valve means and block said passageway upon the differential of pressures in said chambers reaching a predetermined value, said valve means comprising a pair of axially aligned members in said piston rod respectively movable in response to excessive pressure built up in one chamber to block said passageway.

5. In a double-acting fluid motor of the type having a cylinder and a movable piston carried by a hollow piston rod in said cylinder dividing the same into a pair of chambers of mutually dependent volume, locking and damping means comprising in combination: means forming a fluid passageway through said piston and piston rod to intercommunicate said chambers; a pair of movable valve members in said piston rod each adapted to move to close the passageway and each responsive to pressure in a respective one of said chambers whereby to close said passageway upon the pressure in either of said chambers reaching a predetermined value; and single spring means anchored between said valve members and stressed to urge said valve members to open position.

6. A motion damping assembly for a movable element comprising in combination: a pair of expansible-contractible fluid chambers of mutually dependent complemental volumes having movable wall means connected to said element to coordinate the change in respective volumes of said chambers with movement of said element; means in said movable wall means forming a fluid passageway intercommunicating said chambers, said passageway having a smooth bore portion with closed ends and spaced radial ports therein communicating respectively with said chambers at points on opposite sides of a mid-point in said bore portion; a pair of piston valves positioned in said bore and each slidable inwardly therein to close one of said radial ports to block said passageway; a compression spring positioned between said piston valves and urging the same outwardly from said mid-point to open said ports; and a second pair of ports communicating said respective chambers with points outward of said respective piston valves whereby pressure in either of said chambers urges one of said piston valves inwardly against said spring to block said passageway as aforesaid.

7. The system claimed in claim 6 further characterized by having a second passageway through said movable wall means intercommunicating said chambers, said second passageway having a restrictive bleed orifice therein.

8. In a fluid pressure actuated servo system of the type which includes a double-acting fluid motor having chambers of variable mutually dependent volumes, a source of fluid under pressure connected by a supply conduit and a return conduit to said motor, and a control valve interposed in said conduits and operable selectively when in one or the other of a first or second position to supply pressurized fluid to one or the other of said chambers to actuate the same, and return fluid from the non-acting chamber to said source, said valve having a third position in which both said conduits are blocked, a locking and damping assembly which includes in combination: a fluid passageway intercommunicating said chambers, said passageway having a smooth bore portion with closed ends and at least two axially spaced radial ports communicating said chambers respectively with said bore portion at points on opposite sides of a mid-point therein, said ports being flow restrictive with respect to the balance of said passageway; a pair of piston valves positioned in said bore and each slidable therein to close one or the other of said ports to block said passageway; a compression spring positioned between said piston valves and stressed to urge the same outwardly to open said ports; and a second pair of radial ports communicating said bore with respective ones of said chambers at points in said bore outwardly of the respective piston valves, whereby pressure in either of said chambers urges a respective one of said piston valves inwardly against the urging of said spring to block said passageway as aforesaid.

9. The system claimed in claim 8 further characterized by having a second passageway intercommunicating said chambers, said second passageway having a restrictive bleed orifice therein to permit gradual equalization of the pressure in said chambers and the opening of said piston valves.

10. A motion damping assembly for a movable element comprising in combination a pair of expansible, contractible fluid chambers of mutually dependent, complemental volumes, having movable wall means connected to said element to coordinate the change in respective volumes of said chambers with movement of said element; means in said movable wall means forming a fluid passageway intercommunicating said chambers, said passageway having spaced, flow restrictive valve ports therein; a pair of pressure actuated valves, each positioned adjacent a respective one of said valve ports, normally in open position, and movable to close said adjacent valve port to block said passageway; spring means anchored against said valves, and urging same to open position; a pair of actuating chambers each adjacent one of said valves adapted to actuate the same upon the introduction of fluid under pressure into said actuating chamber; and a second pair of ports communicating with said respective chambers and with said respective actuating chambers whereby an excess of pressure in either of said chambers over that in the other, urges one of said pressure-actuated valves against said spring to block said passageway as aforesaid.

11. In a double acting fluid motor of the type comprising a cylinder, a piston in said cylinder dividing the same into a pair of chambers of mutually dependent volume, and a hollow piston rod extending through said cylinder and carrying said piston; locking and damping means comprising passage defining means in said piston and rod adapted to communicate said chambers with the interior of said rod, a valve cartridge within said rod having an outer wall in fluid-sealed relation with a portion of the inner wall of said hollow piston rod whereby the interior of said rod is divided into a plurality of fluid compartments, means in said cartridge wall respectively communicating said compartments with the interior of said cartridge, and valve means associated with each of said last mentioned means movable to block fluid flow from one chamber to the other when pressure in the one chamber exceeds that in the other chamber by a predetermined amount.

12. The device defined in claim 11 in which said means in said cartridge wall comprise two pair of axially spaced opening defining means of different cross-sectional area, and in which the smaller of said openings are normally in communication through the cartridge interior, said movable valve means being disposed between said openings and movable to close the smaller openings to prevent further fluid flow through the cartridge from one chamber to the other when pressure in the one chamber exceeds that in the other chamber by a predetermined amount.

13. The device defined in claim 12 in which means defining a minute opening through said piston are provided communicating said pair of chambers.

References Cited in the file of this patent

UNITED STATES PATENTS 1,609,472    Heil _____ Dec. 7, 1926

(Other references on following page)

UNITED STATES PATENTS

| | | | |
|---|---|---|---|
| 2,240,039 | Hickman | Apr. 29, | 1941 |
| 2,372,710 | Chisholm, Jr. | Apr. 3, | 1945 |
| 2,418,325 | Wassall | Apr. 1, | 1947 |
| 2,424,233 | Greenough | July 22, | 1947 |
| 2,591,492 | Anderson | Apr. 1, | 1952 |
| 2,633,102 | Baldwin | Mar. 31, | 1953 |
| 2,676,663 | Smith | Apr. 27, | 1954 |
| 2,687,706 | Glenny | Aug. 31, | 1954 |

FOREIGN PATENTS

| | | | |
|---|---|---|---|
| 655,019 | Great Britain | July 4, | 1951 |